S. A. CRAIG.
ELECTRIC INSECT TRAP.
APPLICATION FILED APR. 14, 1913.
1,085,023.
Patented Jan. 20, 1914.
2 SHEETS—SHEET 2.
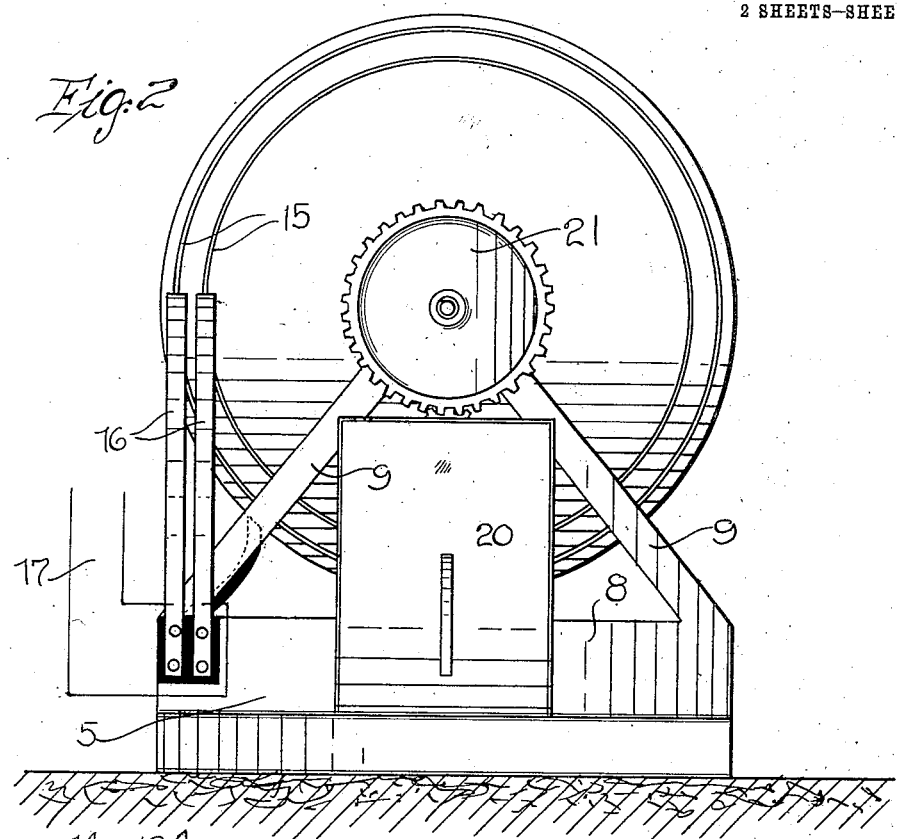
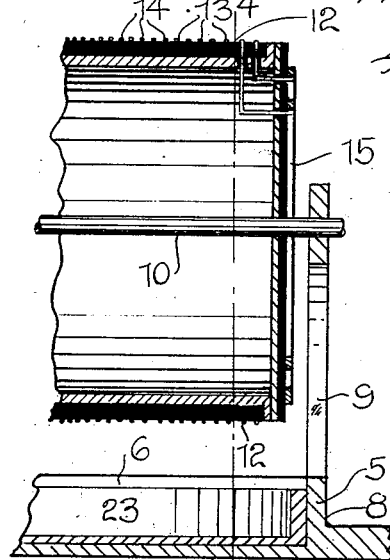
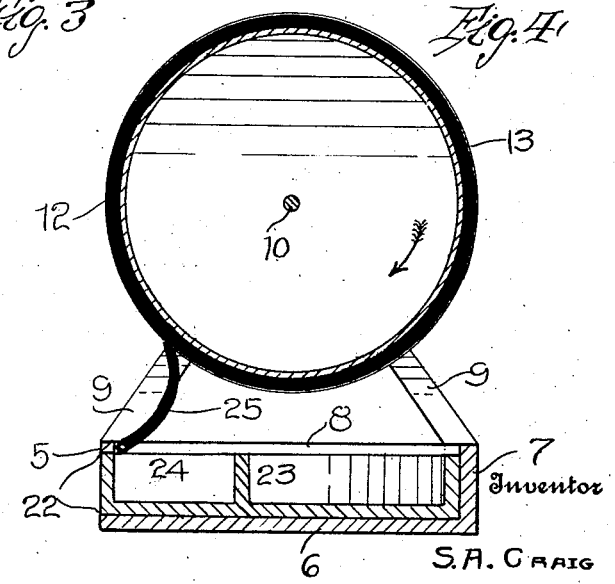
Witnesses
Robert M. Sutphen
A. I. Hind
Inventor
S. A. Craig
By Watson E. Coleman
Attorney

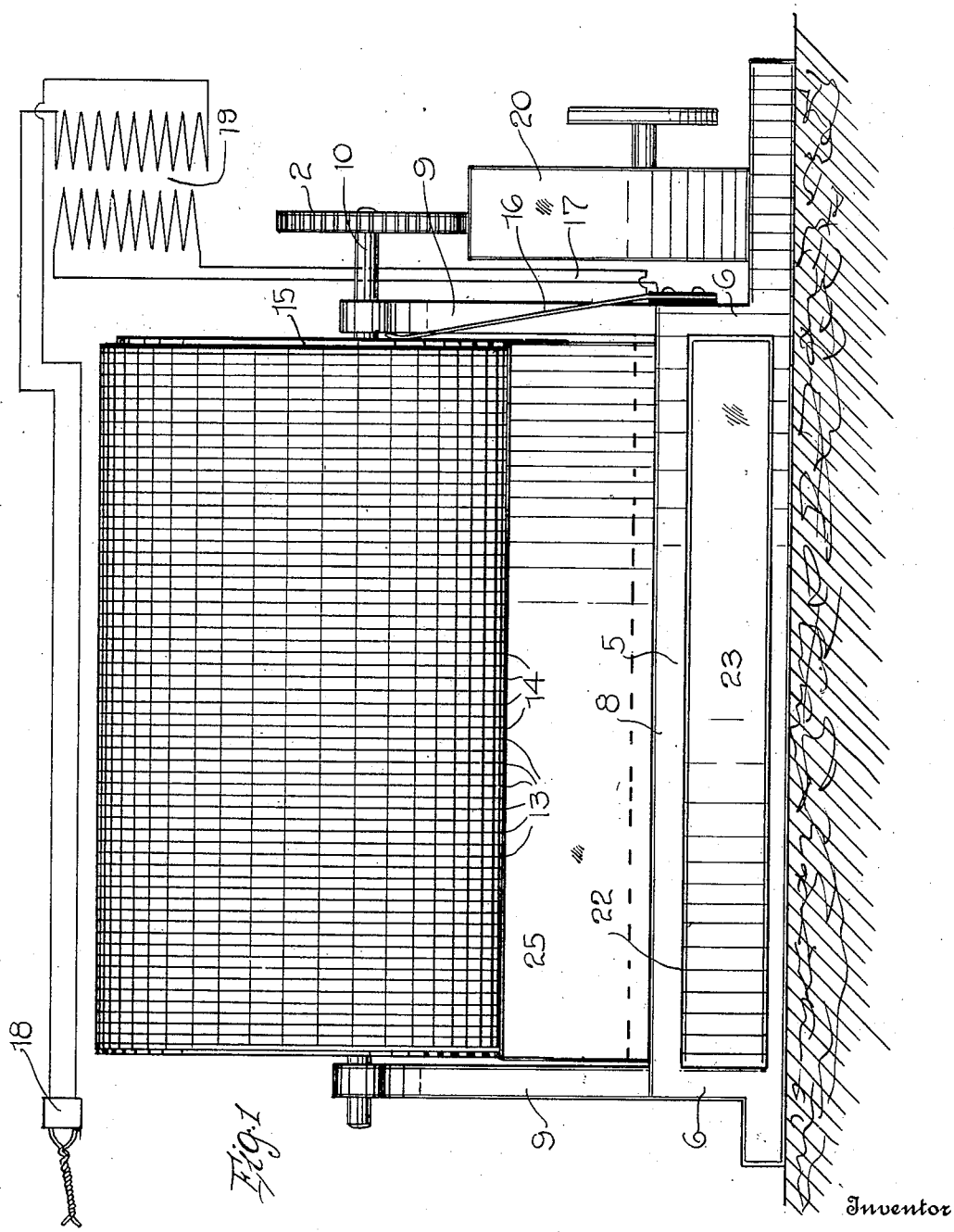

UNITED STATES PATENT OFFICE.

SAMUEL A. CRAIG, OF EL PASO, TEXAS.

ELECTRIC INSECT-TRAP.

1,085,023.   Specification of Letters Patent.   Patented Jan. 20, 1914.

Application filed April 14, 1913. Serial No. 761,089.

*To all whom it may concern:*

Be it known that I, SAMUEL A. CRAIG, a citizen of the United States, residing at El Paso, in the county of El Paso and State of Texas, have invented certain new and useful Improvements in an Electric Insect-Trap, of which the following is a specification, reference being had to the accompanying drawings.

This invention relates to an improved electrical insect trap and has for its primary object to provide a simply constructed and highly efficient trap for electrocuting house flies and similar insects.

Another and more specific object of the invention resides in the provision of a constantly rotating drum having circumferentially wound thereon the positive and negative wires of an electric circuit, said wires being disposed closely adjacent to each other and adapted to close the circuit through the body of the insect when the same contacts therewith, and means for dislodging the flies from the periphery of the drum.

Another object of the invention is to provide improved means for mounting the drum so that the same may be arranged in spaces of comparatively restricted dimensions, and a removable bait pan disposed beneath the drum and containing a compartment into which the insects are directed from the revolving drum by means of the stationary brush.

Still another object of the invention is to produce an insect trap of the above character which may be manufactured at comparatively small cost and is of great convenience in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of an insect trap embodying the present invention; Fig. 2 is an end elevation thereof; Fig. 3 is a detail longitudinal section of one end of the drum; Fig. 4 is a transverse section taken on the line 4—4 of Fig. 3.

Referring in detail to the drawing, 5 designates a frame, the body portion of which consists of a base plate 6 having longitudinal side walls 7 and end walls 8. With the end walls, suitable supporting standards or brackets 9 are integrally formed. In these supports, the ends of the drum shaft 10 are journaled.

The drum 11 is preferably constructed of sheet metal and is supported upon the shaft 10 or in any desired manner. Upon the periphery of the drum body, suitable insulating material indicated at 12 is arranged and secured and around this insulating material, the positive and negative wires of an electric circuit indicated at 13 and 14 respectively, are spirally coiled or wound. These wires at one of their ends are separately secured in any preferred manner to the insulating material. The other ends of the wires are connected respectively to metal rings or annuli 15 which are suitably fixed to one end of the drum body. With these metal rings, the ends of spring contact plates 16 engage, said plates being suitably fixed to the base of the frame in which the drum is mounted. To these contact plates, the current conducting wires 17 are connected, said wires beinf provided with a switch plug indicated at 18 which is adapted for threaded engagement with the lamp socket of an electric lighting circuit. A transformer conventionally illustrated at 19 is arranged in the circuit to increase the voltage of the current supplied to the wires 13 and 14 wound upon the periphery of the drum.

On one end of the main frame 5, a spring motor generally designated by the numeral 20 is arranged. This motor may be of any approved construction and includes the usual gear train, one element of which meshes with a pinion 21 fixed to one end of the drum shaft 9 whereby said drum may be revolved.

The front side wall 7 of the frame 5 is provided with an opening 22 through which a pan 23 may be inserted, and disposed upon the base plate 6 beneath the drum 10. This pan is adapted to contain a suitable bait to attract the flies or other insects, and is provided with a partition wall to form a separate compartment 24 therein in which a poisonous liquid may be disposed, if desired. To the end walls 8 of the frame, the ends of a longitudinally disposed brush 25 are secured, said brush being arranged contiguous to the compartment 24 of the pan 23.

From the above description, it is thought that the construction and operation of the invention will be clearly apparent. The flies or other insects attracted by the bait in the pan 23 alight upon the periphery of the drum 10. The wires 13 and 14 are disposed closely adjacent to each other so that the feet of the insect will rest upon the positive and negative wires, and the circuit will thus be closed through the insect's body. The insect will thus be either killed or stunned and as the drum rotates, the bristles of the brush 25 contacting with the periphery thereof will sweep the insects from the drum into the liquid containing compartment 24 of the bait pan. It will thus be seen that the insects will not accumulate upon the periphery of the drum so that other insects alighting thereon will not contact with the circuit wires and thus escape. It will also be appreciated that owing to the fact that the insects are immediately removed from the drum, the device is kept in a thoroughly sanitary condition.

My improved trap will be found of special convenience in eradicating the common house fly. It is obvious, however, that the trap may be used for various other analogous purposes. Owing to its comparatively simple construction, the device can be produced at small manufacturing cost, is inconspicuous and will occupy but a minimum of space.

While I have shown and described the preferred construction and arrangement of the several parts, it will be understood that the invention is susceptible of considerable modification in the form, proportions and arrangement thereof without departing from the essential features or sacrificing any of the advantages of the invention.

Having thus described the invention, what is claimed is:

1. A trap of the character described comprising a revoluble drum, spaced positive and negative wires spirally wound upon the periphery of said drum and insulated from each other, a current supply circuit including means to close the circuit through the wires on said drum when the adjacent wires are bridged by the body of an insect, and a transformer arranged in the supply circuit.

2. A trap of the character described comprising a revoluble drum provided upon its periphery with insulating material, positive and negative circuit wires spirally wound upon said insulating material and disposed in closely contiguous spaced relation, means for revolving said drum, a main current supply circuit in electrical connection with the wires upon the drum, and means arranged contiguous to the periphery of the revolving drum to remove the insects trapped thereby.

3. A trap of the character described comprising a revoluble drum, said drum being provided upon its periphery with a coating of insulating material, spaced positive and negative circuit wires spirally wound upon said insulating coating and disposed in closely contiguous relation, said drum being provided upon one end with spaced metal rings to which one end of said wires are respectively connected, main current supply circuit, stationary contact plates to which the wires of said circuit are connected, said plates each engaging one of the metal rings on the drum to close the circuit through the wires wound upon said drum when the adjacent wires are bridged by the body of an insect, means for revolving said drum, a bait pan removably arranged beneath the drum and provided with a separate compartment to receive the insects, and a brush arranged contiguous to the periphery of the drum and engaging therewith to remove the insects from the drum as the same revolve and direct the same into the compartment of the bait pan.

In testimony whereof I hereunto affix my signature in the presence of two witnesses.

SAMUEL A. CRAIG.

Witnesses:
  JOSEPH H. McBROOM,
  BEATRICE McENIRY.